United States Patent
Khizroev et al.

(10) Patent No.: US 6,738,233 B2
(45) Date of Patent: May 18, 2004

(54) PERPENDICULAR MAGNETIC RECORDING HEAD WITH A MAGNETIC SHIELD TO REDUCE SIDE READING

(75) Inventors: Sakhrat Khizroev, Pittsburgh, PA (US); Dmitri Litvinov, Pittsburgh, PA (US); Roy Gustafson, Pittsburgh, PA (US); Nisha Shukla, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 265 days.

(21) Appl. No.: 10/028,845

(22) Filed: Dec. 20, 2001

(65) Prior Publication Data

US 2002/0109947 A1 Aug. 15, 2002

Related U.S. Application Data

(60) Provisional application No. 60/257,125, filed on Dec. 20, 2000.

(51) Int. Cl.[7] .................................................. G11B 5/39
(52) U.S. Cl. ....................................................... 360/319
(58) Field of Search ................................. 360/319, 126, 360/317

(56) References Cited

U.S. PATENT DOCUMENTS

| | | | | |
|---|---|---|---|---|
| 4,935,832 A | * | 6/1990 | Das et al. | 360/112 |
| 5,075,956 A | * | 12/1991 | Das | 29/603.14 |
| 6,198,608 B1 | * | 3/2001 | Hong et al. | 360/320 |
| 6,262,869 B1 | * | 7/2001 | Lin et al. | 360/324.11 |
| 6,430,010 B1 | * | 8/2002 | Murdock | 360/319 |
| 6,466,419 B1 | * | 10/2002 | Mao | 360/324.12 |
| 6,556,392 B1 | * | 4/2003 | Mao et al. | 360/324.12 |

FOREIGN PATENT DOCUMENTS

| | | | |
|---|---|---|---|
| JP | 6-36238 | * | 2/1994 |
| JP | 9-190613 | * | 7/1997 |
| WO | 98/16921 | * | 4/1998 |

OTHER PUBLICATIONS

S. H. Charap et al., "Thermal Stability of Recorded Information at High Densities", *IEEE Trans. On Magn.*, vol. 33, No. 1, pp. 978–983 (1997).

S. K. Khizroev et al., "Recording Heads with Track Widths Suitable for 100 Gbit/in$^2$ Density", *IEEE Trans. On Magn.*, vol. 35, No. 5, pp. 2544–2546 (1999).

S. K. Khizroev et al., "Considerations in the Design of Probe Heads for 100 Gbit/in$^2$ Recording Density", *IEEE Trans. On Magn.*, vol. 33, No. 5, pp. 2893–2895 (1997).

W. Cain et al., "Challenges in the Practical Implementation of Perpendicular Magnetic Recording", *IEEE Trans. On Magn.*, vol. 32, No. 1, pp. 97–102 (1996).

* cited by examiner

*Primary Examiner*—David Ometz
(74) *Attorney, Agent, or Firm*—Benjamin T. Queen, II, Esq.; Pietragallo, Bosick & Gordon

(57) ABSTRACT

A read head for perpendicular magnetic recording that reduces side reading. The read head includes a read element and a magnetic shield spaced apart from the read element. The magnetic shield at least partially surrounds the read element at an air-bearing surface of the read element. The ratio of an air-bearing surface area of the magnetic shield to an air-bearing surface area of the read element is from about 1:1 to about 40:1.

19 Claims, 4 Drawing Sheets

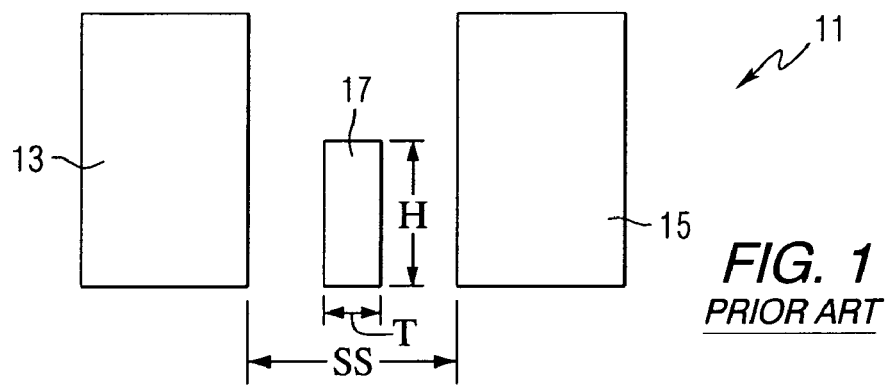
FIG. 1
*PRIOR ART*
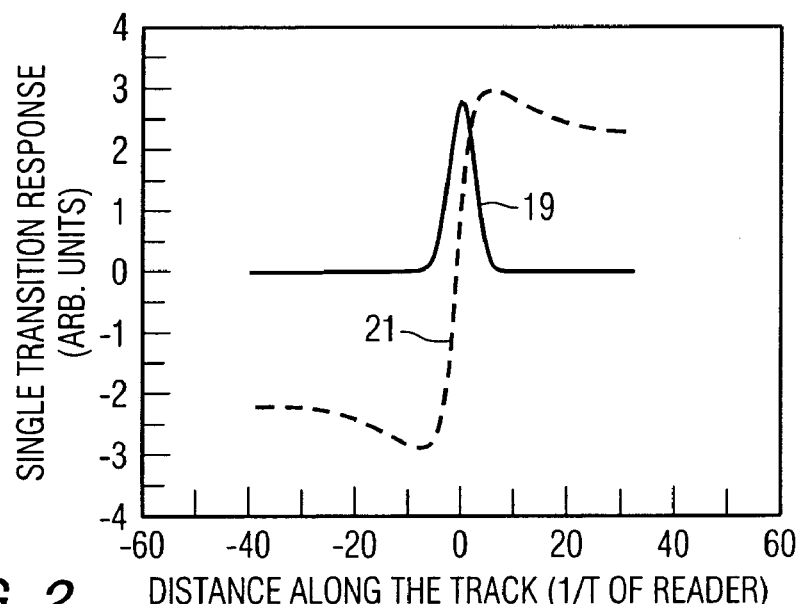
FIG. 2 DISTANCE ALONG THE TRACK (1/T OF READER)
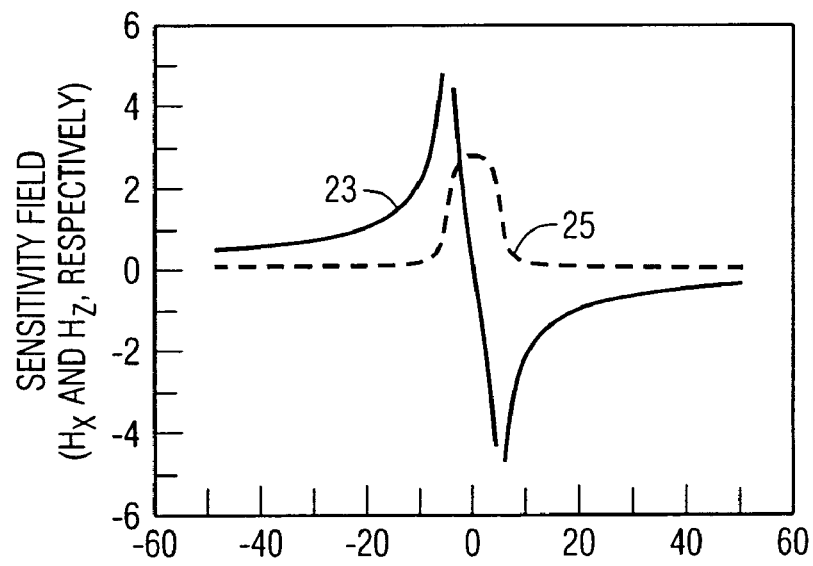
FIG. 3 DISTANCE ALONG THE TRACK (1/T OF READER)

PERPENDICULAR MAGNETIC RECORDING HEAD WITH A MAGNETIC SHIELD TO REDUCE SIDE READING

CROSS REFERENCE TO RELATED APPLICATION

This application claims the benefit of U.S. Provisional Application No. 60/257,125 filed Dec. 20, 2000.

FIELD OF THE INVENTION

The invention relates to perpendicular magnetic recording read heads, and more particularly to such a read head having a magnetic shield to reduce side reading.

BACKGROUND OF THE INVENTION

Longitudinal magnetic recording heads for use with computer hard disc drives are generally known. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches may likely be necessary to overcome the limitations of longitudinal magnetic recording.

An alternative to longitudinal magnetic recording is perpendicular magnetic recording. Perpendicular magnetic recording is believed to have the capability of extending recording densities beyond the limits of longitudinal magnetic recording due, for example, to use of a thicker recording layer and/or the use of a soft magnetic underlayer. However, a disadvantage of implementing perpendicular magnetic recording is that there is not a generally acceptable perpendicular reader design. As a result, a conventional longitudinal reader configuration is typically implemented in perpendicular magnetic recording. FIG. 1 illustrates a conventional longitudinal reader 11. The reader 11 includes a first magnetic shield 13 and a second magnetic shield 15, each spaced apart from a reader 17. The first and second magnetic shields 13 and 15 have a shield-to-shield spacing SS. The reader 17 has a stripe height H and a track thickness T. The track-width of the reader 17 is not shown, but is generally perpendicular to the track thickness T.

It has been determined that the conventional longitudinal reader configuration does not optimally suit perpendicular magnetic recording, especially at high recording densities. One reason is that conventional longitudinal reader configurations implemented in perpendicular magnetic recording are going to have significant non-desirable side reading. Side reading generally refers to the reader reading or sensing magnetic fields in tracks adjacent to a track upon which a read operation is being performed.

The purpose of the magnetic shields, such as the magnetic shields 13 and 15 for the conventional longitudinal reader 11 illustrated in FIG. 1, is to define the linear resolution of the reader. In other words, the resolution of the reader in an "along-the-track" direction is roughly determined by the shield-to-shield spacing SS of the magnetic shields 13 and 15. However, for the conventional longitudinal reader 11, there is not generally any effective "shield-to-shield" boundary in an "across-the-track" direction to prevent the undesirable side reading. The side reading becomes even more problematic when the conventional longitudinal reader 11 is implemented in a perpendicular magnetic recording system because of enhancement of the side reading by use of the soft magnetic underlayer in the perpendicular recording medium.

Another disadvantage of using a conventional longitudinal reader for perpendicular magnetic recording is a relatively degraded resolution of the reader if it is used with perpendicular media. Resolution of a reader is generally defined by the smallest bit size the reader is capable of distinguishing. Therefore, the better the resolution of the reader, the smaller the bit size the reader can distinguish. Consequently, the better the resolution of the reader, the larger the data density than can be read back from a recording medium.

It has been determined that another fundamental disadvantage of implementing a conventional longitudinal reader in perpendicular magnetic recording is the fundamental difference of waveforms generated in the perpendicular and longitudinal recording modes. For example, FIG. 2 schematically illustrates calculated signal responses by the same longitudinal reader, such as reader 11, from a longitudinal 19 and a perpendicular 21 media single transition, wherein a single transition corresponds to the time instance of zero. The calculations were based on the reciprocity principle using a commercial three-dimensional boundary element field solver to calculate the sensitivity functions. From FIG. 2, it can be determined that the longitudinal response 19 is relatively more local than the perpendicular response 21. In other words, the longitudinal signal 19 comes only from the transition while the perpendicular signal 21 spreads significantly from the transition.

FIG. 3 illustrates calculated sensitivity fields used in the reciprocity principle for the longitudinal and perpendicular modes illustrated in FIG. 2. More specifically, FIG. 3 illustrates a longitudinal component 23 (Hx) and a perpendicular component 25 (Hy) of the sensitivity field for the longitudinal reader at the vicinity of the recording layer. It can be seen that the sensitivity function of the longitudinal reader has a bi-polar shape for the longitudinal component 23 and a mono-polar shape for the perpendicular component 25. In other words, the bi-polar shape of the longitudinal component 23 effectively provides a "differentiating" of the signal at the transition, and consequently avoids reading far from the transition. Therefore, it would be advantageous to provide a perpendicular read head design with the sensitivity field of the bi-polar shape to reduce or eliminate side reading by the effective "differentiation". Ideally, for the purpose of keeping the same signal "channel" properties, i.e. a shape of the waveform of the playback signal directly sensed by a reader and thus methods to analyze this signal, the shapes of the perpendicular and the in-plane field components should be interchanged when transitioned from longitudinal to perpendicular recording.

There is identified, therefore, a need for a read head for a perpendicular magnetic recording system which overcomes disadvantages, limitations, or shortcomings of known read heads, and in particular conventional longitudinal readers, that may be used in a perpendicular magnetic recording system.

SUMMARY OF THE INVENTION

Embodiments of the invention meet the identified need, as well as other needs, as will be more fully understood following a review of this specification and drawings.

In accordance with an aspect of the invention, a read head for perpendicular magnetic recording includes a read element and means for magnetically shielding the read element to reduce side reading. The means for magnetically shielding the read element may include a magnetic shield spaced apart from the read element and at least partially surrounding the read element at an air-bearing surface of the read element. The ratio of an air-bearing surface area of the magnetic shield to an air-bearing surface area of the read element is from about 1:1 to about 40:1. In addition, the magnetic shield may be spaced apart from the read element a distance from about 10 nm to about 50 nm.

In accordance with an additional aspect of the invention, a read head for perpendicular magnetic recording comprises a read element and a magnetic shield spaced apart from the read element. The ratio of an air-bearing surface area of the magnetic shield to an air-bearing area of the read element is from about 1:1 to about 40:1. The magnetic shield at least partially surrounds the read element at an air-bearing surface of the read element.

In accordance with yet another aspect of the invention, a magnetic disc drive storage system includes a housing, a perpendicular magnetic storage medium positioned in the housing and a read head for perpendicular magnetic recording positioned adjacent the perpendicular magnetic storage medium. The read head of the magnetic disc drive storage system is constructed in accordance with the invention as described herein.

BRIEF DESCRIPTION OF THE DRAWINGS

FIG. 1 illustrates a partial schematic view of a conventional longitudinal reader.

FIG. 2 graphically illustrates calculated signal responses by a longitudinal reader for a longitudinal and a perpendicular media single transition.

FIG. 3 graphically illustrates a longitudinal and a perpendicular component of a sensitivity field for a longitudinal reader.

DETAILED DESCRIPTION OF THE INVENTION

The invention provides a perpendicular magnetic recording head, and more particularly a perpendicular magnetic recording read head for reducing side reading during a read operation. The invention also provides for improved resolution of the read head. The invention is particularly suitable for use with a magnetic disc drive storage system. A recording head, as used herein, is generally defined as a head capable of performing read and/or write operations.

Figure 4:
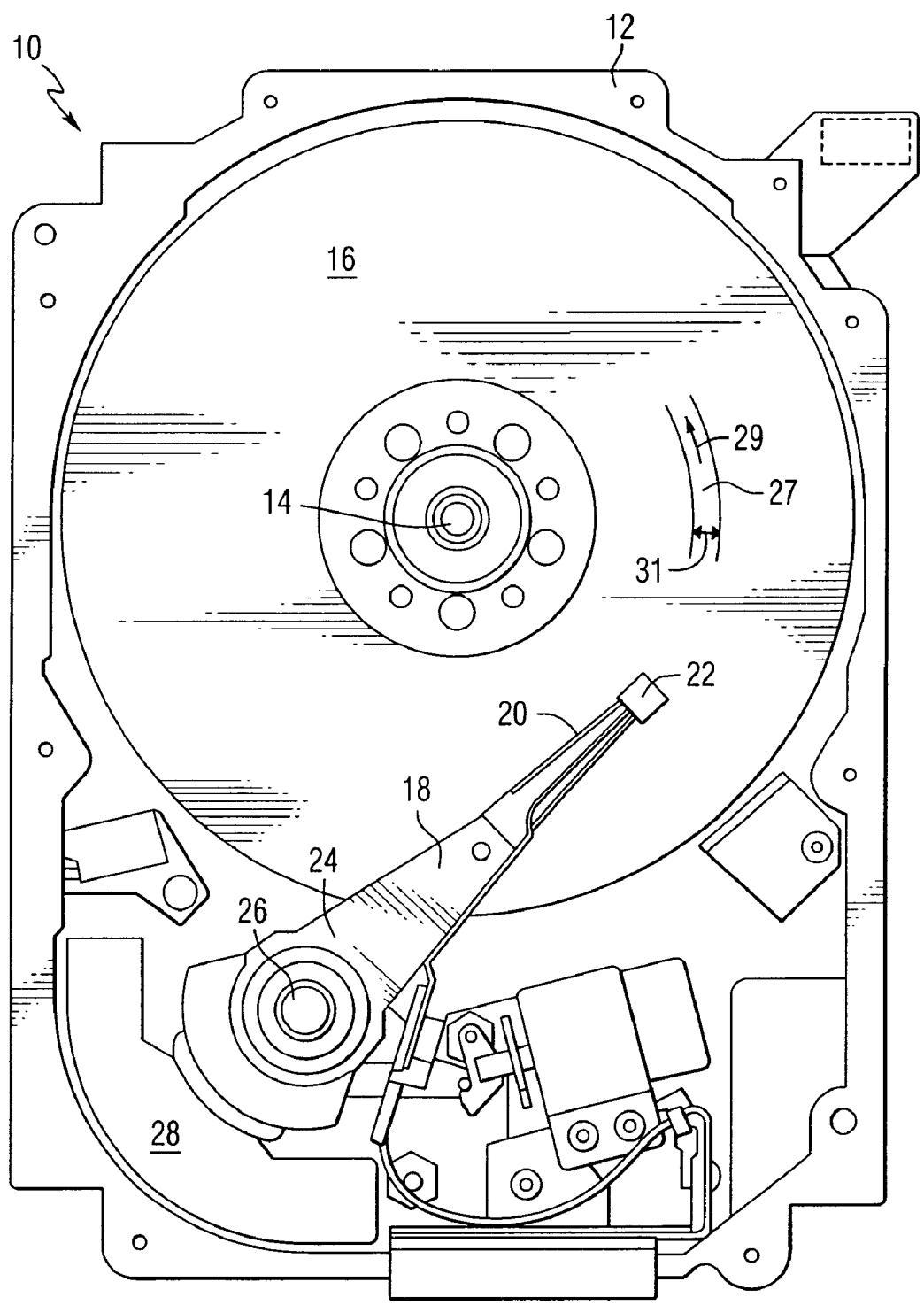
FIG. 4 is a pictorial representation of a magnetic disc drive storage system of the invention.

FIG. 4 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. An "along-the-track" direction is indicated by arrow 29 and an "across-the-track" direction is indicated by arrow 31. The actuator motor 28 is regulated by a controller, which is not shown in this view and is well known in the art.

Figure 5:
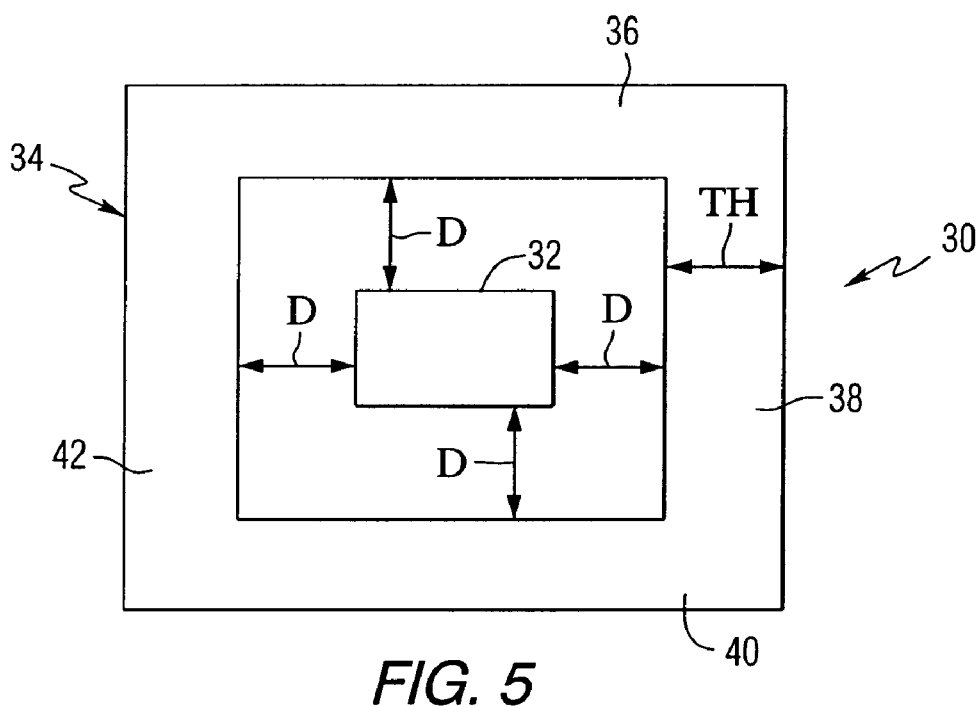
FIG. 5 is a partial schematic air-bearing surface view of a read head constructed in accordance with the invention.

FIG. 5 illustrates an embodiment of a read head 30, which may be part of the recording head 22, for perpendicular magnetic recording constructed in accordance with the invention. FIG. 5 is a partial schematic air-bearing surface (ABS) view of the read head 30. The read head 30 includes a read element 32 and means for magnetically shielding the read element 32 to, for example, reduce or minimize side reading of the read head 30 and/or to improve resolution of the read head 30. The read element 32 may be, for example, a magnetoresistance (MR) type read element, a giant magnetoresistance (GMR) type read element, or the like.

Perpendicular magnetic recording is generally symmetric in many aspects with respect to an along-the-track direction (see arrow 29 in FIG. 4) and an across-the-track direction (see arrow 31 in FIG. 4) because primarily the hard magnetic recording layer magnetization is directed generally perpendicular to the plane of the disc, such as disc 16. This is in contrast to longitudinal magnetic recording where the magnetization is directed generally parallel to the plane of the disc, such as disc 16. Accordingly, for perpendicular magnetic recording it is desirable to shield the read element 32 in both the along-the-track and the across-the-track direction. Thus, the means for magnetically shielding the read element in accordance with the invention includes means, such as a magnetic shield, wherein at least a portion of the magnetic shield shields the read element 32 in the across-the-track direction and at least a portion of the magnetic shield also magnetically shields the read element 32 in the along-the-track direction to minimize or reduce side reading during a read operation.

Still referring to FIG. 5, the read head 30 includes a magnetic shield, generally designated by reference number 34 for magnetically shielding the read element 32. The magnetic shield 34 is spaced apart from the read element 32 to at least partially surround the read element 32 at the ABS of the read element 32. Specifically, the magnetic shield 34, in this embodiment, includes magnetic shield members 36, 38, 40 and 42 which are connected to collectively form the magnetic shield 34 and to surround the read element 32, particularly at the ABS of the read element 32. This particular configuration provides optimal magnetic shielding in both the along-the-track and the across-the-track directions while performing the read operation.

The magnetic shield 34 and, in particular, the individual magnetic shield members 36, 38, 40 and 42 which form the magnetic shield 34 may include, for example, at least one material selected from the group consisting of Permalloy, nitrides such as FeAlN, FeTaN, high moment alloys of Ni/Fe, e.g. Ni/Fe (45/55), and high moment materials such as Fe/Co compounds with a moment higher than 2.4 T.

In accordance with the invention, the magnetic shield 34 is constructed such that a thickness TH thereof is relatively narrow in comparison to a thickness of magnetic shields used in a conventional longitudinal read head. The thickness TH, which may be the same or may be different for each of the individual magnetic shield members 36, 38, 40 and 42, is selected such that the ratio of an ABS area of the magnetic shield 34 to an ABS area of the read element 32 may be in the range from about 1:1 to about 40:1. For example, The ABS area of the magnetic shield 34 and the ABS area of the read element 32 may be as shown in FIG. 5. However, it will be appreciated that the ABS of the magnetic shield 34 and the ABS of the read element 32 may be of other shapes and configurations. The ABS area of the magnetic shield 34 may be in the range of about 10,000 nm$^2$ to about 40,000 nm$^2$. By forming the magnetic shield 34 to have the identified ratio of the ABS area thereof to the air-bearing surface area of the read element 32, the invention allows for creation of a magnetic shield which effectively "differentiates". By "differentiation" it is meant that the sensitivity field has a bi-polar shape relatively localized in the vicinity of a transition. The bi-polar localized shape of the sensitivity field is equivalent to the fact that the reader is going to be sensitive only to a varying in space magnetization pattern. In other words, it is going to be insensitive to a uniform (DC) magnetization pattern in a recording medium. This provides that the waveforms provided by the invented reader configuration, if used along with a perpendicular medium, is very similar to the waveforms provided by a conventional longitudinal reader when used along with a longitudinal medium.

Another aspect of the invention is the distance D which separates the read element 32 from the individual magnetic shield members 36, 38, 40 and 42 of the magnetic shield 34. The distance D may be from about 10 nm to about 50 nm. In addition, it will be appreciated that the distance D may be the same on all sides of the read element 32 or the distance D may be varied for one or more sides while still within the stated range. By maintaining the distance D within the stated range, the resolution of the read head 30 is improved. The smaller the distance D, the better the resolution. However, D can not be too small because if it is too small the maximum magnitude of the sensitivity field is not going to be sufficiently large. Consequently, the playback signal and the signal to noise ratio (SNR) are going to be insufficiently small.

Figure 6:
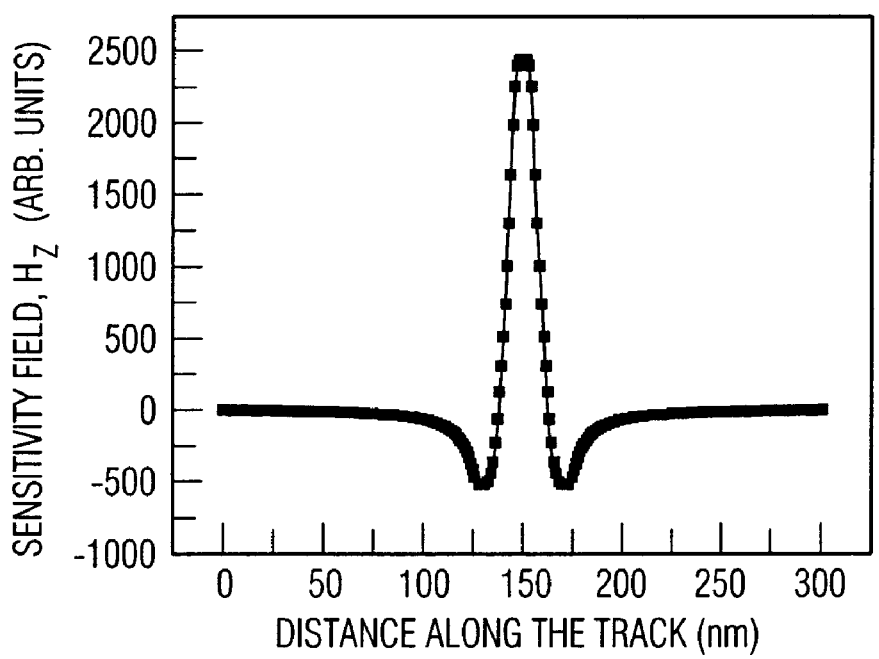
FIG. 6 is a graphical illustration of a perpendicular component of a sensitivity field versus distance along the track for the read head illustrated in FIG. 5.

FIG. 6 graphically illustrates a perpendicular component (Hz) of a sensitivity field for the read head 30 versus the distance along the track. Because perpendicular recording is generally symmetric, as previously discussed herein, a graphical illustration for the perpendicular component of the sensitivity field versus an across-the-track distance would be essentially the same as shown in FIG. 6. As shown, the sensitivity field for the read head 30 is generally bi-polar, with an essential signal of both polarities and no essential response or signal at a far distance from the read element 32. This is primarily due to the concentration of the magnetic flux in the region of the magnetic shield 34 instead of allowing for the magnetic flux to be spread outside of the magnetic shield 34. Although the graph in FIG. 6 does not appear absolutely asymmetric ("absolutely asymmetric" implies that the positive and negative parts are identical with the reversing of their polarities), still there are significant non-zero fields for both polarities, so it is considered "bi-polar." This is in contrast to, for example, the perpendicular field component (curve 25 in FIG. 3), which has a significant signal only for one polarity. Physically, such a bi-polar field characteristic means that the magnetic flux is closing or circulating in a finite space, i.e. it comes from the air bearing surface (ABS) region of the read element and goes back through the ABS regions of the finite size shields. This is in contrast to the longitudinal reader configuration, for which the flux is returned through the ABS regions of the shields, which is many times larger than the area of the read element. Consequently, provided that the returning sensitivity field has a dominantly perpendicular component, a conventional reader is more sensitive to side reading when it is used with a perpendicular medium.

Figure 7:
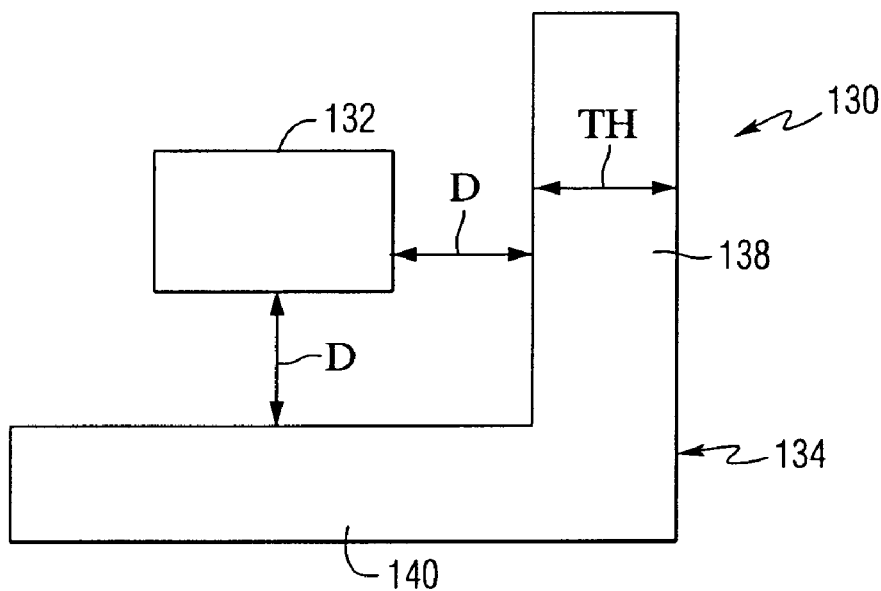
FIG. 7 is a partial schematic air-bearing surface view of an additional embodiment of a read head constructed in accordance with the invention.

FIG. 7 illustrates a partial schematic air-bearing surface view of an additional embodiment of a read head 130, which may be part of the recording head 22, for perpendicular magnetic recording. The read head 130 is similar in many aspects to the read head 30, as was described in detail herein. The read head 130 includes a read element 132 and means for magnetically shielding the read element 132 to reduce or improve side reading and to improve resolution of the read head 130. Specifically, the means for magnetically shielding the read element 132 includes a magnetic shield, generally designated by reference number 134. The magnetic shield 134 includes individual magnetic shield members 138 and 140 which are connected to collectively form the magnetic shield 134. The magnetic shield 134, in this embodiment, at least partially surrounds the read element 132 at an ABS of the read element 132 to magnetically shield during a read operation. By providing the magnetic shield 134 with individual magnetic shield members 138 and 140, at least a portion of the magnetic shield 134 magnetically shields the read element 132 in the across-the-track direction and at least a portion of the magnetic shield 134 magnetically shields the read element 132 in an along-the-track direction of the read element as well. Due to the symmetric nature of perpendicular magnetic recording, as discussed, the read head 130 will result in the reduction of side reading and improvement of resolution of the read head 130.

The magnetic shield 134 is constructed to have a thickness TH. In addition, the magnetic shield 134 is spaced apart from the read element 132 a distance of D. The thickness TH and distance D may be the same as for the read head 30, as described herein.

Figure 8:
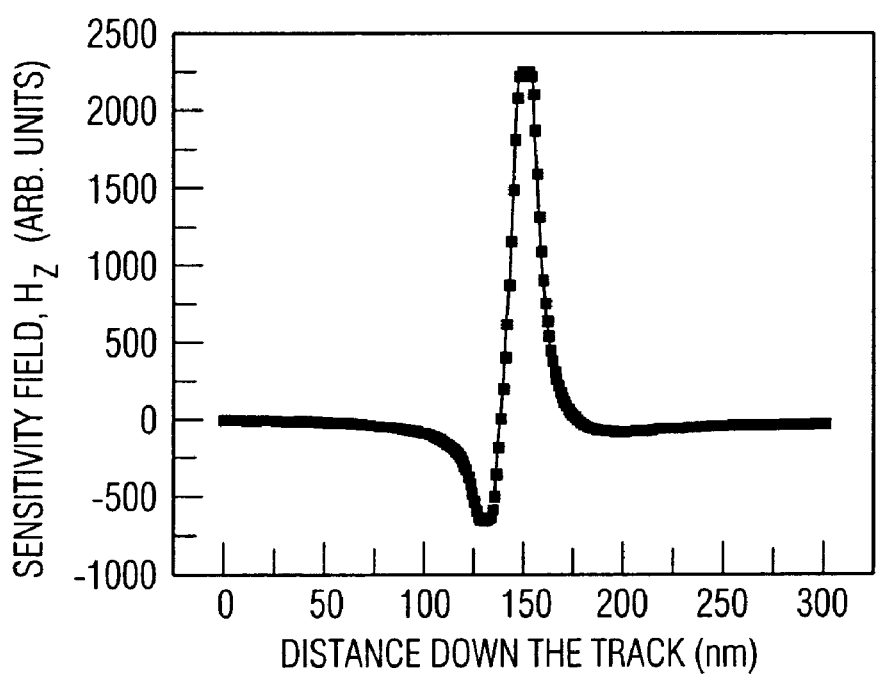
FIG. 8 is a graphical illustration of a perpendicular component of a sensitivity field versus distance along the track for the read head illustrated in FIG. 7.

FIG. 8 is a graphical illustration of a perpendicular component (Hz) of the sensitivity field for the read head 130 versus a distance in an along-the-track direction for the read head 130. In comparison with the graph in FIG. 6, the graph shown in FIG. 8 has a more "bipolar" shape in the sense that there is one of each polarity tails. The fact that the negative polarity tail is smaller in magnitude than the positive polarity tail is explained by the fact that the net ABS area of the shields is larger than the ABS area of the reader.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A read head for perpendicular magnetic recording, comprising:

a read element; and means for magnetically shielding said read element to reduce side reading, wherein said means for magnetically shielding includes a magnetic shield spaced apart from said read element and wherein said magnetic shield has an air-bearing surface area in the range of about 10,000 nm$^2$ to about 40,000 nm$^2$.

2. The read head of claim 1, wherein said read element is a magnetoresistance type read element.

3. The read head of claim 1, wherein said read element is a giant magnetoresistance type read element.

4. The read head of claim 1, wherein said means for magnetically shielding said read element includes said magnetic shield, at least a portion of said magnetic shield magnetically shielding said read element in an across the track direction of said read element and at least a portion of said magnetic shield magnetically shielding said read element in an along the track direction of said read element.

5. The read head of claim 1, wherein said magnetic shield at least partially surrounds said read element at an air-bearing surface of said read element.

6. The read head of claim 1, wherein said magnetic shield includes at least one material selected from the group consisting of Permalloy, nitrides such as FeAlN and FeTaN, Ni/Fe compounds such as Ni/Fe (45/55) and CoZrNb, Fe/Co compounds.

7. The read head of claim 1, wherein the ratio of an air-bearing surface area of said magnetic shield to an air-bearing surface area of said read element is from about 1:1 to about 40:1.

8. The read head of claim 1, wherein said magnetic shield is spaced apart from said read element a distance of from about 10 nm to about 50 nm.

9. A read head for perpendicular magnetic recording, comprising:
   a read element; and
   a magnetic shield spaced apart from said read element, wherein the ratio of an air-bearing surface area of said magnetic shield to an air-bearing surface area of said read element is from about 1:1 to about 40:1.

10. The read head of claim 9, wherein said magnetic shield at least partially surrounds said read element at an air-bearing surface of said read element.

11. The read head of claim 9, wherein at least a portion of said magnetic shield magnetically shields said read element in an across the track direction of said read element.

12. The read head of claim 9, wherein at least a portion of said magnetic shield magnetically shields said read element in an along the track direction of said read element.

13. The read head of claim 9, wherein said magnetic shield has an air-bearing surface area in the range of about 10,000 $nm^2$ to about 40,000 $nm^2$.

14. The read head of claim 9, wherein said magnetic shield is spaced apart from said read element a distance of from about 10 nm to about 50 nm.

15. A magnetic disc drive storage system, comprising:
   a housing;
   a perpendicular magnetic storage medium positioned in said housing; and
   a read head for perpendicular magnetic recording positioned adjacent said perpendicular magnetic storage medium, said read head comprising:
      a read element; and
      a magnetic shield spaced apart from said read element, wherein the ratio of an air-bearing surface area of said magnetic shield to an air-bearing surface area of said read element is from about 1:1 to about 40:1.

16. The magnetic disc drive storage system of claim 15, wherein said magnetic shield at least partially surrounds said read element at an air-bearing surface of said read element.

17. The read head of claim 15, wherein said means for magnetically shielding said read element includes a magnetic shield, at least a portion of said magnetic shield magnetically shielding said read element in an across the track direction of said read element and at least a portion of said magnetic shield magnetically shielding said read element in an along the track direction of said read element.

18. The read head of claim 15, wherein said magnetic shield is spaced apart from said read element a distance from about 10 nm to about 50 nm.

19. The read head of claim 15, wherein said magnetic shield surrounds said read element at an air-bearing surface of said read element.

* * * * *

UNITED STATES PATENT AND TRADEMARK OFFICE
CERTIFICATE OF CORRECTION

PATENT NO. : 6,738,233 B2
DATED : May 18, 2004
INVENTOR(S) : Sakhrat Khizroev et al.

It is certified that error appears in the above-identified patent and that said Letters Patent is hereby corrected as shown below:

Column 5,
Lines 5-6, "The ABS" should read -- the ABS --.

Signed and Sealed this

Twentieth Day of December, 2005

JON W. DUDAS
*Director of the United States Patent and Trademark Office*